(12) United States Patent
Tahmasebi Maraghoosh et al.

(10) Patent No.: US 9,240,032 B2
(45) Date of Patent: Jan. 19, 2016

(54) MULTI-MODALITY DEFORMABLE REGISTRATION

(71) Applicant: KONINKLIJKE PHILIPS N.V., Eindhoven (NL)

(72) Inventors: Amir Mohammad Tahmasebi Maraghoosh, Ridgefield, CT (US); Jochen Kruecker, Washington, DC (US); Mahmoudreza Sharifi, Croton-On-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/384,163

(22) PCT Filed: Mar. 13, 2013

(86) PCT No.: PCT/IB2013/051991
§ 371 (c)(1),
(2) Date: Sep. 10, 2014

(87) PCT Pub. No.: WO2013/136278
PCT Pub. Date: Sep. 19, 2013

(65) Prior Publication Data
US 2015/0043794 A1  Feb. 12, 2015

Related U.S. Application Data

(60) Provisional application No. 61/611,071, filed on Mar. 15, 2012, provisional application No. 61/679,218, filed on Aug. 3, 2012.

(51) Int. Cl.
*G06T 3/00* (2006.01)
*G06T 7/00* (2006.01)

(52) U.S. Cl.
CPC ............. *G06T 3/0068* (2013.01); *G06T 7/0028* (2013.01); *G06T 2207/10088* (2013.01); *G06T 2207/10136* (2013.01); *G06T 2207/20048* (2013.01); *G06T 2207/30081* (2013.01)

(58) Field of Classification Search
CPC ................ G06T 3/0068; G06T 7/0028; G06T 2207/10088; G06T 2207/10136; G06T 2207/20048; G06T 2207/30081
See application file for complete search history.

(56) References Cited

U.S. PATENT DOCUMENTS

| | | | |
|---|---|---|---|
| 8,768,431 B2 * | 7/2014 | Ross et al. | 600/410 |
| 2005/0101855 A1 * | 5/2005 | Miga et al. | 600/407 |

(Continued)

OTHER PUBLICATIONS

Park, M., et al., "Deformed Lattice Detection via Mean-Shift Belief Propagation," European Conference on Computer Vision (ECCV), Oct. 2008, pp. 474-485.*

(Continued)

*Primary Examiner* — Yubin Hung

(57) ABSTRACT

A method, system, and computer program product are provided for performing a multi-modal deformable imaging registration between two different modalities for which a functional dependency is missing or very difficult to identify. The method provides a nonlinear mapping between every pair of points in the two image modalities by calculating the nonlinear mapping for only a limited number of identifiable landmarks within the two modalities and a statistical deformation model of the structure of interest. The method comprises: calculating a mean deformation and a plurality of deformation mode Eigen vectors for a body structure from images from the same imaging mode with different deformation states for a plurality of subjects; performing a registration of a limited number of uniquely identifiable landmark points between images from two different imaging modalities for the same subject to calculate the deformation field for the landmarks from the images; determining weights for each deformation mode Eigen vector using deformation field values at the landmarks with the mean deformation and the deformation mode vectors; and summing the mean deformation field and the linear combination of the weighted deformation mode vectors to determine the deformation field between the different imaging modes for all the points within the images.

15 Claims, 4 Drawing Sheets

(56) References Cited

U.S. PATENT DOCUMENTS

| | | | |
|---|---|---|---|
| 2007/0167784 A1 | 7/2007 | Shekhar | |
| 2008/0170770 A1* | 7/2008 | Suri et al. | 382/128 |
| 2008/0260230 A1* | 10/2008 | Gotardo et al. | 382/131 |
| 2008/0317308 A1* | 12/2008 | Wu et al. | 382/128 |
| 2009/0190815 A1* | 7/2009 | Dam et al. | 382/131 |
| 2009/0326363 A1 | 12/2009 | Li | |
| 2010/0002921 A1* | 1/2010 | Fenchel et al. | 382/128 |
| 2011/0142308 A1* | 6/2011 | Ishikawa et al. | 382/128 |
| 2014/0071124 A1* | 3/2014 | Kawahara | 345/419 |

OTHER PUBLICATIONS

Chowdhury Najeeb et al., "Linked Statistical Shape Models for Multi-Modal Segmentation: Application to Prostate CT-MR Segmentation in Radiotherapy Planning", Medical Imaging 2011: Computer-Aided Diagnosis, SPIE, 1000 20TH St. Bellingham WA 98225-6705 USA, vol. 7963, No. 1, Mar. 3, 2011, pp. 1-15, XP060008531.

Tahmasebi Amir M. et al., "A Statistical Model-Based Technique for Accounting for Prostate Gland Deformation in Endorectal Coil-Based MR Imaging", 2012 Annual International Conference of the IEEE Engineering in Medicine and Biology Society, Aug. 1, 2012, pp. 5412-5415, XPO55070267.

Hu Y., et al, "A Statistical Motion Model Bases on Biomechanical Simulations for Data Fusion During Image-Guided Prostate Interventions", MICCAI 2008, Part I, LNCS 5241, pp. 737-744, Springer-Verlag Berlin Heidelberg 2008.

Xu S. et al., "Real-Time MRI-TRUS Fusion for Guidance of Targeted Prostate Biopsies", Clinical Sites Research Program—Philips Research North America, National Institutes of Health, Comput Aided Surg,. Sep. 2008, 10th International Conference on Medical Image Computing and Computer-Assisted Intervention (MICCAI 2007), pp. 1-17.

Singh A.K. et al., "Initial Clinical Experience with real-Time Transrectal Ultrasonography-Magenetic Resonance Imaging Fusion-Guided Prostate Biopsy", National Institutes of Health Author Manuscript, BJU Int. Apr. 2008, 101(7), pp. 1-9.

* cited by examiner

MULTI-MODALITY DEFORMABLE REGISTRATION

CROSS-REFERENCE TO PRIOR APPLICATIONS

This application is the U.S. National Phase application under 35 U.S.C. §371 of International Application Serial No. PCT/IB2012/051991, filed on Mar. 13 2013, which claims the benefit of U.S. Application Ser. No. 61/611,071, filed on Mar. 15, 2012, and U.S. Application Ser. No. 61/679,218, filed on Aug. 3, 2012. These applications are hereby incorporated by reference herein.

FIELD OF THE INVENTION

The invention relates to the field of medical imaging and more particularly to a method, system and computer program product for automatic multi-modality deformable registration using statistical deformation modeling and sparse deformation data.

BACKGROUND

Image registration is an important challenge in medical image processing. The main goal in medical image registration is to calculate a geometrical transformation that aligns either the same image or different images of the same object or structure. The different images can have the same modality or different modalities. Common modalities for medical image registration include, but are not limited to: Magnetic Resonance Imaging (MRI), Computerized Tomography (CT), and Ultrasound (US).

An important subset of image registration problems deals with matching images from different image modalities sometimes referred to as multi-modality image fusion. Multi-modal image registration is particularly challenging as the relationship between grey values of multi-modal images is not always easy to determine, and in some cases (e.g. MRI to US), a functional dependency is generally missing or very difficult to identify.

One example of multi-modal image registration is the fusion of MRI images with US images in image-guided procedures, such as prostate biopsies or brachytherapy. The MRI modality provides high resolution anatomical images; however, MRI is expensive for intra-operative procedures such as prostate biopsies. On the other hand, the US modality is ideal for real-time imaging required for image guided procedures, such as prostate biopsy, but has quite poor image resolution. Fusion of these two modalities combines the advantage of real-time imaging (US) with high resolution imaging (MRI). For example, during a targeted prostate biopsy procedure, fusion of pre-operative MRI images with real-time US imaging is crucial in locating cancerous areas in ultrasound images that can be easily identified in MRI images. It would be advantageous to develop automatic image registration techniques to fuse pre-operative MRI images of the prostate with real-time trans-rectal ultrasound (TRUS) imaging.

The lack of a functional dependency between the MRI and US image modalities has made it very difficult to take advantage of intensity-based metrics for image registration. Therefore, most proposed methods of MRI-to-US image fusion are focused on point matching techniques in one of two ways: (1) a set of common landmarks (such as the contour of the urethra) that are visible in the images from both modalities are either manually or automatically extracted and used for point-based registration; or (2) the surface of the prostate is segmented within each of the two modalities using automatic or manual techniques, and the extracted cloud of points are fed to a point-based registration framework that tries to minimize the distance between the two point sets.

In the Philips Uronav system, for example, a point-based rigid registration approach is implemented to register MRI with TRUS using segmented prostate surface point data. The prostate gland is automatically segmented as a set of surface contour points in both US and MRI images. The rigid registration tries to find the best set of translation and rotation parameters that minimize the distance between the two point sets. However, the prostate is not a rigid shape, and the shape of the prostate may deform differently during acquisition of images by each of these modalities. MRI images are typically acquired while an Endorectal coil (ERC) is inserted in the rectum for enhanced image quality. The TRUS imaging is performed freehand with a TRUS probe placed in direct contact with the rectum wall adjacent to the prostate gland, thereby deforming the shape of the prostate gland during image acquisition.

SUMMARY

A method, system and computer program product are provided for a multi-modal deformable image registration.

According to one aspect of the invention, a method is provided for a multi-modal deformable image registration. The method comprises two phases. In the first phase a deformation model is trained to determine a mean deformation and a plurality of deformation mode vectors using images from the same "high definition" imaging modality with different deformation states. In this context, high definition refers to an imaging modality that clearly depicts structures of interest. In the second phase the deformation required to match an image from one imaging modality with one deformation state to an image from a different imaging modality with a different deformation state is estimated. To estimate the deformation between two states of deformation in two different modalities, a set of landmarks, uniquely identifiable in both modalities are extracted and nonlinearly registered. A deformation field that matches the two modalities at every point is then realized by inserting the calculated deformation values at the identified landmarks into the deformation model and solving for the Eigen coefficients of the deformation modes. Finally, the mean deformation field and the linear combination of the weighted deformation mode vectors are summed to determine the deformation field between the two imaging modes at the rest of the points.

According to one embodiment the mean deformation and the plurality of deformation mode vectors are calculated by: for each subject, spatially aligning the images to a common reference frame; warping the imaging data for each subject from the same imaging modality and different deformation states using a similarity metric such as intensity-based metric and a non-linear transformation technique such as BSpline; and performing principal component analysis to determine the mean deformation and the plurality of deformation mode vectors.

According to one embodiment, instead of applying deformable registration between intensity images of the same modality (with different deformation states) in the training phase, a large set of landmarks may be used. In this embodiment, instead of intensity-based registration, a point-based nonlinear registration is performed between all the landmarks at two different deformation states to generate a deformation field for the body structure of interest. Then, a mean deformation and deformation mode Eigen vectors are calculated from the deformation fields of multiple subjects.

According to one embodiment the image from the different imaging modality is at a different deformation state from all of the deformation states used to calculate the mean deformation and the plurality of deformation mode vectors. For example, the deformation state of a prostate associated with a TRUS probe, which is different from the deformation state associated with an endorectal coil used during MRI imaging and the zero deformation state without an endorectal coil during MRI imaging.

According to one embodiment the different imaging modality is a real-time imaging modality. In one embodiment, this real-time imaging modality is ultrasound imaging using a TRUS probe.

According to another aspect of the present invention, a system is provided for performing a multi-modal deformable imaging registration. The system comprises: at least one processor; at least one memory operably connected to the processor; and at least one program of instruction stored on the at least one memory and executed by the at least one processor. The program of instruction comprises: program instructions for calculating a mean deformation and a plurality of deformation mode Eigen vectors for a body structure from images from the same high definition imaging mode with different deformation states for a plurality of subjects; program instructions for performing a nonlinear registration between a set of landmark points from the high definition imaging modality and a different imaging modality for the same subject to calculate the deformation field for the landmarks from the images; program instructions for determining weights for each deformation mode Eigen vector using deformation field values at the landmarks with the mean deformation and the deformation mode vectors; and program instructions for summing the mean deformation field and the linear combination of the weighted deformation mode vectors to determine the deformation field between the different imaging modes.

According to one embodiment, the system further comprises a real-time imaging system using the different imaging modality.

According to one embodiment, the real-time imaging system is an ultrasound imaging system and further comprises a trans-rectal ultrasound transducer operably connected to the at least one processor for generating imaging data.

According to one embodiment, the system further comprises a high definition imaging system operably connected with the at least one processor for generating the high definition images.

According to one embodiment, the high definition imaging system is a magnetic resonance imaging system operably connected to a magnetic resonance imaging device.

According to one embodiment, the system further comprises an endorectal coil disposed in a subject to enhance the imaging of the high definition imaging system.

According to one embodiment, the mean deformation and the plurality of deformation mode vectors are calculated by: for each subject, spatially aligning the images to a common reference frame; warping the imaging data for each subject from the same imaging modality but different deformation states using a similarity metric such as intensity-based metric and a non-linear transformation technique such as BSpline; and performing principal component analysis to determine the mean deformation and the plurality of deformation mode vectors.

According to another aspect of the invention, a computer program product is provided for performing a multi-modal deformable imaging registration comprising at least one computer readable storage device having encoded thereon at least one computer executable program of instruction, the at least one computer executable program of instruction comprising: program instructions for calculating a mean deformation and a plurality of deformation mode Eigen vectors for a body structure from images from the same high definition imaging mode with different deformation states for a plurality of subjects; program instructions for performing a registration of landmark points between images from the high definition imaging modality and a different imaging modality for the same subject to calculate the deformation field for the landmarks from the images; program instructions for determining weights for each deformation mode Eigen vector using deformation field values at the landmarks with the mean deformation and the deformation mode vectors; and program instructions for summing the mean deformation field and the linear combination of the weighted deformation mode vectors to determine the deformation field between the different imaging modes.

According to one embodiment, the program instructions for calculating the mean deformation and the plurality of deformation mode vectors, comprise: program instructions for spatially aligning the images to a common reference frame for each subject; program instructions for warping the imaging data for each subject from the same imaging modality but different deformation states using a similarity metric such as intensity-based metric and a non-linear transformation technique such as BSpline; and program instructions for performing principal component analysis to determine the mean deformation and the plurality of deformation mode vectors.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, system, and computer program product for a multi-modal deformable imaging registration. The multi-modal deformable registration is performed in two phases. In the first phase, a deformation model is generated for the body structure that is to be the site of the registered images. The model is generated using images from the same high definition imaging mode with different deformation states for each of a plurality of subjects. The deformation model is generated in the form of a mean deformation and a plurality of deformation mode vectors.

In the second phase, a deformation field is estimated for deforming an image from the high definition imaging mode at one deformation states from the first phase to an image from another imaging modality with a different deformation state. A deformation field required to match images of a single subject from different modalities is estimated by performing a registration between the images from different modalities using a set of uniquely identifiable landmarks in both imaging modalities. The calculated deformation values for the limited number of landmarks are used to determine the weights for each of the deformation mode vectors. In order to determine the deformation field between the two different imaging modalities at the rest of the points (besides the landmarks used for the aforementioned registration) the mean deformation field and the linear combination of the weighted deformation mode vectors are summed.

Figure 1:
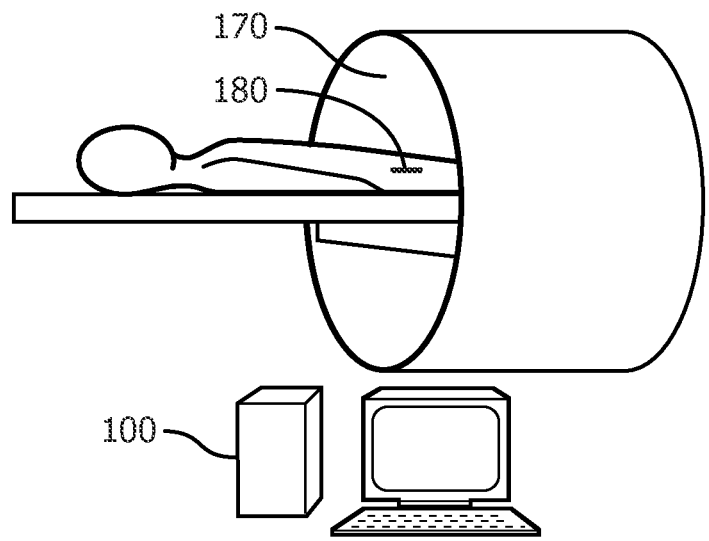
FIG. 1 is an isometric view of a system for providing a first image acquisition for multi-modal deformable image registration according to an embodiment of the present invention.

FIG. 1 shows a system for providing a first phase of a multi-modal deformable imaging registration according to an embodiment of the present invention. The system comprises a high definition imaging device 170. In the illustrated example, the high definition imaging device is an MRI device for taking MRI images. However, it should be understood that any other high definition imaging device, such as a CT or ultrasound machines, may also be used to practice the present invention.

The system for performing the first phase of a multi-modal deformable image registration also comprises a processing system 100, such as a general purpose computer or other processing device.

Figure 3:
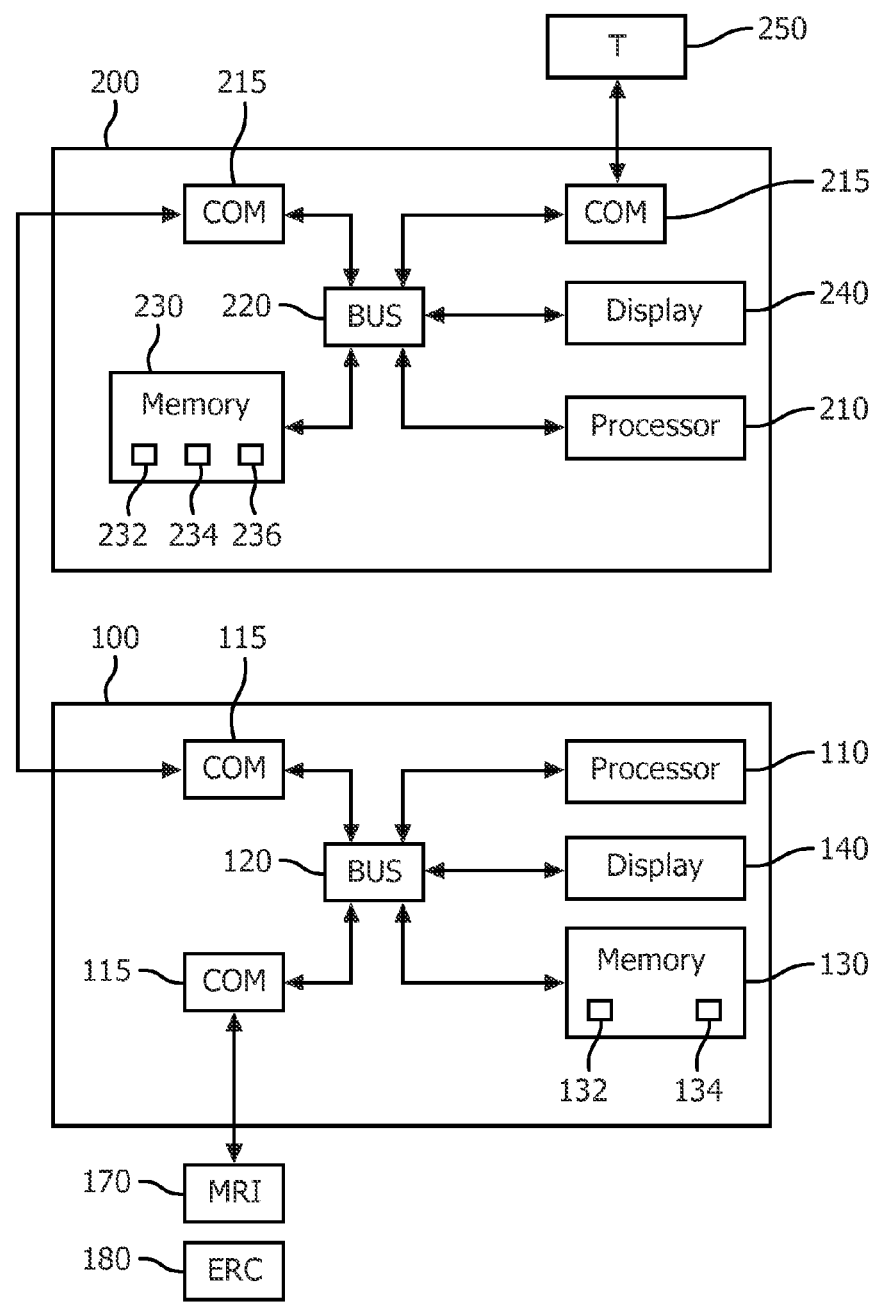
FIG. 3 is a block diagram of a system for providing a multi-modal deformable image registration according to an embodiment of the present invention.

FIG. 3 is a block diagram of the system for performing multi-modal deformable image registration according to an embodiment of the present invention. As shown in FIG. 3, the processing system 100 (FIG. 1) comprises a processor 110, a memory 130 operably connected to the processor such as by a system bus 120 for example, and input/output (I/O) connectors 115 that operably connect the imaging device 170 to the processor 110. The processor 110 may be may be any device capable of executing program instructions, such as one or more microprocessors. Moreover, the processor 110 may be embodied in a general purpose computer.

The memory 130 may be any volatile or non-volatile memory device suitable for storing data and program instructions, such as a removable disc, a hard drive, a CD, a Random Access Memory (RAM), a Read Only Memory (ROM), or the like. Moreover, the memory 130 may comprise one or more memory devices.

The I/O connectors 115 may be any hardware that operably connects the processor 110 to the imaging device 170, another computer, or a data source. The I/O connectors may include, but are not limited to RS232 serial interface, Ethernet, and USB ports.

The processing system 100 further comprises an imaging program 132 stored on the memory 130 and executed by the processor 110 to receive and process imaging data from the imaging device 170, and to display the images on a display 140. The imaging program 132 may be any be any known imaging program appropriate for the type of imaging device being used to obtain high definition images, and may include modules or units for various image processing functions.

The processing system 100 also comprises a modeling program 134 that generates a deformation model for use in multi-modal image registration, as will be described in detail, herein.

Figure 4:
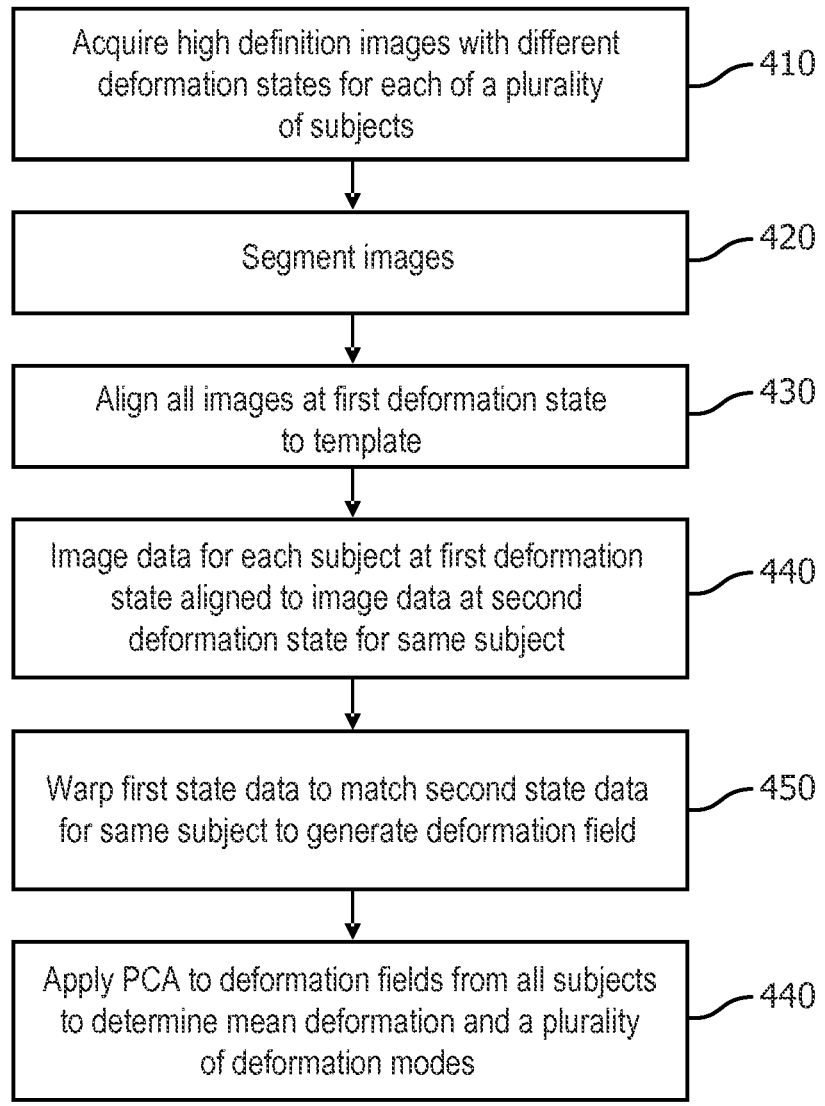
FIG. 4 is a flow diagram of a method for training a deformation model for use in a multi-modal deformable imaging registration according to an embodiment of the present invention.

FIG. 4 is a flow diagram of a method for training a deformation model for use in a multi-modal deformable imaging registration according to an embodiment of the present invention. In the following description, an embodiment is described for registering MRI images of a prostate to real-time ultrasound images of the prostate of the same subject for an image guided procedure such as a prostate biopsy or brachytherapy. However, as will be understood by those skilled in the art, additional embodiments may be directed to other imaging modalities than MRI, ultrasound, or both. Also, additional embodiments may be directed to different body structures and different procedures.

The imaging program 132 obtains high definition images with different deformation states for each of a plurality of subjects (Step 410). In the illustrated example, the images are taken at a second deformation state, with an endorectal coil (ERC) 180 inserted in the rectum which causes a deformation of the prostate, and at a first deformation state, without the ERC. As is known in the art, the ERC is used to enhance the image quality for prostate MRI images. The number of subjects is selected such that it is greater than the number of mode vectors that will be used in the deformation model. For example, a subject size of 50 may be used.

Optionally, the segmented images allow voxel by voxel identification and registration.

The images from all of the subjects at the first deformation state (w/o ERC MRI) are spatially aligned to a template, such as the average of the w/o ERC images from all of the subjects (Step 430). The spatial alignment could be realized using rigid transformation, affine transformation or a nonlinear registration or a combination of the three.

Then the first deformation state (w/o ERC) MRI image is spatially aligned to the second deformation state (w/ ERC) MRI image from the same subject for each subject using an intensity-based metric (Step 440).

After the first deformation state (w/o ERC) MRI image is spatially aligned to the second deformation state (w/ ERC) MRI image from the same subject, the first deformation state (w/o ERC) MRI image is nonlinearly warped to the second deformation state (w/ ERC) MRI image from the same subject (Step 450). The nonlinear warping is repeated for each subject.

The nonlinear warping may be performed using a B-Spline registration technique with an intensity based metric. Alternatively, another nonlinear estimation technique such as a finite element method may be used to warp the second state image data to the first stage image data of the same subject to obtain a deformation field for the prostate of each subject. The formula for the deformation field is the following:

$$\tilde{d}^{<i>} = d^{<i>} - \bar{d} \quad \text{(Eq. 1)}$$

where $d^{<i>}$ and $\bar{d}$ stand for deformation field resulting from the nonlinear registration of w/oERC to wERC MRI for sample training data i and mean deformation field, respectively.

Then, the mean deformation is calculated and principal component analysis (PCA) is used to derive deformation modes from the displacement fields of the subjects used in the first (model) phase of the multi-modal image registration (Step 460).

The mean deformation is calculated by averaging the deformations of the plurality of subjects:

$$\bar{d} = \frac{1}{n} \sum_{i=1}^{n} d^{(i)} \quad \text{(Eq. 2)}$$

Where n is the number of data sets or samples or imaged patients, and i=1, 2, . . . , n refers to the indices of the data sets.

The PCA is used to derive the deformation modes from the displacement fields of the sample images, as follows. If the calculated displacement fields (with three x, y, z components) are $D_{i(m \times 3)}$. Each deformation field is reformatted to a one dimensional vector by concatenating x, y, z components from all data points for the data set.

The covariance matrix $\Sigma$ is calculated as follows:

$$\Sigma = D^T D \quad \text{(Eq. 3)}$$

where $D_{3m \times n} = [\tilde{d}^{<1>} \tilde{d}^{<2>} \ldots \tilde{d}^{<n>}]$ The matrix of deformation eigenvectors, $\Psi$, which diagonalize the covariance matrix $\Sigma$ is found as:

$$\Psi^{-1} \Sigma \Psi = \Lambda \quad \text{(Eq. 4)}$$

Where $\Lambda = |\lambda_i|_{n \times m}$ is a diagonal matrix with eigenvalues of $\Sigma$, as its diagonal elements.

The Eigen vectors of the displacement field matrix ($D_{m \times n}$), where m is the number of data points in a data set is found by:

$$\Phi_i = D \Psi \Lambda^{-1/2} \quad \text{(Eq. 5)}$$

Any displacement field can be estimated from the linear combination of the mean deformation plus the linear combination of the deformation modes ($\phi_i$) as follows:.

$$\hat{d}^{(j)} = \bar{d} + \sum_{i=1}^{k} \alpha_i^{(j)} \varphi_i \quad \text{(Eq. 6)}$$

Where k is the number of deformation modes and k<<n.

In an alternate embodiment the first or training phase comprises calculating a deformation field using a large set of landmarks in place of intensity based registration. Instead of applying deformable registration between intensity images from the same imaging modality (with different deformation states), a large set of landmarks may be used. The landmarks are measured from the same imaging modality at different deformation states. A registration is performed between the landmark locations for one deformation state and the landmark locations for the other deformation states to generate a deformation field. The mean deformation and deformation mode Eigen vectors can be calculated from the deformation field, using principal component analysis, for example. In this embodiment, the set of landmarks for the training phase is much larger than the set of landmarks used in the second phase to calculate weights for the deformation mode Eigen vectors.

Figure 2:
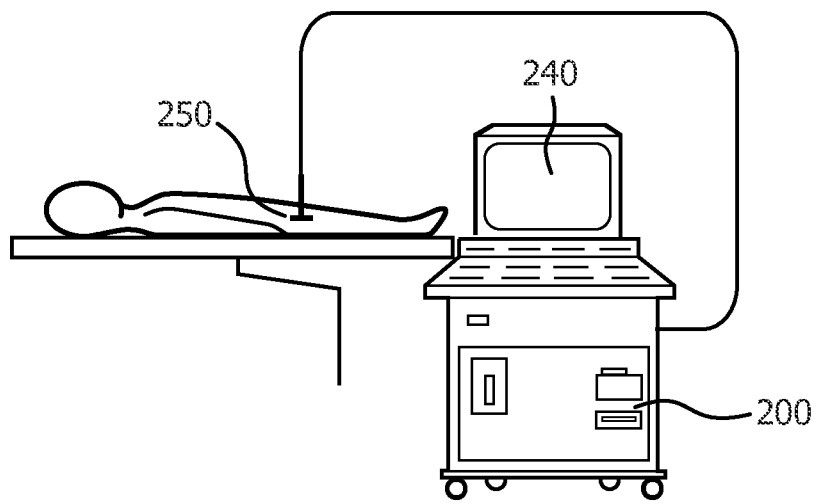
FIG. 2 is an isometric view of a system for providing a second image acquisition for multi-modal deformable image registration according to an embodiment of the present invention.

FIG. 2 shows a system for providing a second phase of a multi-modal deformable imaging registration according to an embodiment of the present invention. The system comprises a second imaging device 250 of a different imaging modality from the high definition imaging device 170. In the illustrated example, the second imaging device is an ultrasound imaging probe, more particularly a trans rectal ultrasound transducer (TRUS) for taking real-time images for an image-guided intervention procedure, such as a prostate biopsy. However, it should be understood that any real-time imaging device or other imaging device may be used to practice the present invention.

The TRUS 250 is operably connected with an imaging system 200. As shown in FIG. 3, the imaging system 200 comprises a processor 210 for processing ultrasound images from imaging data received from the TRUS 250 and presenting them on a display 240. The processor 210 is operably connected with a memory 230 (FIG. 3), such as through a bus 220, for example. Input/output (I/O) connectors 215 that operably connect the imaging device 250 to the processor 210 and the high definition imaging system 100 to the processor 210.

The processor 210 may be any device capable of executing program instructions, such as one or more microprocessors. Moreover, the processor 210 may be embodied in a general purpose computer.

The memory 230 may be any volatile or non-volatile memory device suitable for storing data and program instructions, such as a removable disc, a hard drive, a CD, a Random Access Memory (RAM), a Read Only Memory (ROM), or the like. Moreover, the memory 230 may comprise one or more memory devices.

The I/O connectors 215 may be any hardware that operably connects the processor 210 to the imaging device 250, another computer, or a data source. The I/O connectors may include, but are not limited to RS232 serial interface, Ethernet, and USB ports.

While the imaging system 200 and the high definition imaging system 100 are shown as two separate systems, they may, in fact, be the same system embodied in a single general purpose computer. Alternatively, the imaging data from the high definition imaging system 100 may be provided to the imaging system 200 on a storage device or be transmitted to between systems over a network, such as an intranet or the internet.

The memory 230 has encoded thereon, an imaging program of instruction 232 executable by the processor 210 to receive imaging data from the imaging device 250 and generate images of a body structure. In the illustrated embodiment, the imaging device 250 is a TRUS and the images that are generated are real-time ultrasound images of a prostate.

The memory 230 also has encoded on it, an estimating program of instruction 234, executable by the processor 210 to estimate a deformation in a multi-modal deformable imaging registration.

Figure 5:
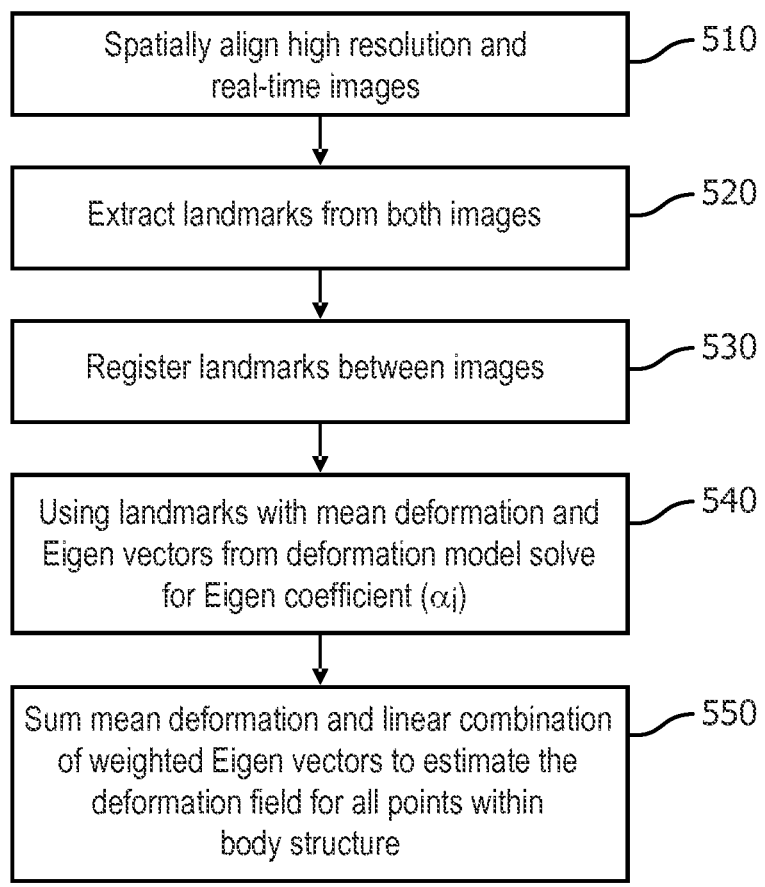
FIG. 5 is a flow diagram of a method for estimating a deformation in a multi-modal deformable imaging registration according to an embodiment of the present invention.

FIG. 5 is a flow diagram of a method for estimating a deformation in a multi-modal deformable imaging registration according to an embodiment of the present invention. This is the second phase of the method for providing a multi-modal deformable imaging registration.

The estimating program of instruction 234 executed by the processor 210 spatially aligns images from two different modalities and two different deformation states for the same subject to a common reference (Step 510). The first image modality may be one of the high definition image modalities such as MRI from the plurality of subjects acquired in step 410 and sent by the processor 110 of the high definition imaging system 100. Alternatively, the high definition image may be acquired by the high definition imaging system 100 separately from the images used for training a template.

The different imaging modality may be a real time ultrasound imaging modality using a TRUS probe 250 according to one embodiment of the present invention. Alternatively, an imaging system for any other modality may be used that would be advantageous to register to the high resolution image.

According to one embodiment, the two different imaging modalities are spatially aligned to the average of the high definition images used to train the deformation model. However, any common reference may be used, so long as both images are aligned to the same reference.

The estimating program of instruction 234 extracts landmarks from both images from the same subject (Step 520). In the illustrated embodiment, the image from a different modality is an ultrasound image using a TRUS probe 250 taken in real-time. The real time TRUS image is used for tool guidance during an intervention for a procedure, such as a prostate biopsy. The other image in this embodiment is a pre-operative MRI image. The processor 210 executing the estimating program of instruction 234 may be the processor for the ultrasound imaging system 200 or it may be a separate processor within either imaging system or external to both imaging systems.

The landmarks may be any landmarks visible in both images, such as the contour of the urethra or prostate surface contour points, for example. The points for the landmarks in each image may be extracted using any known point extraction method, such as intensity-based metrics, for example. The number of points extracted is preferably sufficient to solve for the Eigen values (or Eigen weights or Eigen coefficients) for all of the deformation modes calculated in step 460.

The estimating program of instruction 234 registers the extracted landmark between the two different imaging modalities to determine a transformation matrix for the landmark points (Step 530). This transformation matrix will only be accurate for the landmarks, and will not compensate for the various deformation modes internal to the body structure.

Using the calculated deformation field for matching landmark points with the mean deformation and the Eigen vectors from the deformation model calculated in Step 460, a deformation model solver in the estimating program of instructions 234 calculates Eigen coefficients $\alpha_i$ or Eigen values for each deformation mode i where i=1, 2, . . . , k (Step 540). The deformation model solver calculates the Eigen weights as follows.

$$d^{<j>}\{S\}=\bar{d}\{S\}+\Sigma_{i=1}^{k}\alpha_i^{<j>}\phi_i\{S\} \quad (Eq. 7)$$

where S corresponds to the indices of the set of landmark points.

Then, a deformation field estimator in the estimating program of instruction 234 estimates the deformation field for all points in the imaged body structure by summing the mean deformation and the weighted deformation modes (Step 550). The deformation field estimator sums the mean deformation from step 460 and the linear combination of deformation modes from step 460 with the Eigen values from step 540 as follows.

$$\hat{d}^{<j>}\{P-S\}=\bar{d}\{P-S\}+\Sigma_{i=1}^{k}\alpha_i^{<j>}\phi_i\{P-S\} \quad (Eq. 8)$$

where P corresponds to the all the points in the images.

The invention can take the form of an entirely hardware embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable medium having a machine-executable program of instructions, which when executed by a machine, such as a computer, performs the steps of the method. This program product may be stored on any of a variety of known machine-readable medium, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for providing a multi-modal deformable imaging registration, characterized in the method comprising the steps of:
    generating a deformation model of a structure of interest acquired with a high definition imaging modality at different deformation states for a plurality of subjects;
    calculating a mean deformation and a plurality of deformation mode Eigenvectors for the body structure of interest from the model;
    performing a registration of landmark points between images from the high definition imaging modality and a different imaging modality for the same subject to calculate the deformation field transformation matrix for the landmarks from the images;
    determining weights for each deformation mode Eigenvector using deformation field values at the landmarks with the mean deformation and the deformation mode vectors; and
    summing the mean deformation field and the linear combination of the weighted deformation mode vectors to determine the deformation field between the different imaging modes.

2. The method of claim 1, wherein the mean deformation and the plurality of deformation mode vectors are calculated by:
    for each subject, spatially aligning the images to a common reference frame;
    warping the imaging data for each subject from the different deformation states using an image similarity metric and a non-linear transformation technique; and
    performing principal component analysis to determine the mean deformation and the plurality of deformation mode vectors.

3. The method of claim 1, wherein the mean deformation and the plurality of deformation mode vectors are calculated by:
    for each subject, measuring locations for a set of landmarks;
    performing point-based nonlinear registration between all the landmarks; and generate a deformation model for the landmarks.

4. The method of claim 1, wherein the image from the different modality is at a different deformation state from all of the deformation states used to calculate the mean deformation and the plurality of deformation mode vectors.

5. The method of claim 1, wherein the different imaging modality is a real-time imaging modality.

6. The method of claim 5, wherein the different imaging modality is transrectal ultrasound imaging (TRUS).

7. The method of claim 6, wherein the body structure is a prostate.

8. A system for providing a multi-modal deformable imaging registration, comprising:
at least one processor;
at least one memory operably connected to the processor; and
at least one program of instruction stored on the at least one memory and executed by the at least one processor;
characterized in the processor being configured to:
calculate a mean deformation and a plurality of deformation mode Eigenvectors for a body structure from images from the same high definition imaging mode with different deformation states for a plurality of subjects;
perform a registration of landmark points between images from the high definition imaging modality and a different imaging modality for the same subject to calculate the deformation field transformation matrix for the landmarks from the images;
determine weights for each deformation mode Eigenvector using deformation field values at the landmarks with the mean deformation and the deformation mode vectors; and
sum the mean deformation field and the linear combination of the weighted deformation mode vectors to determine the deformation field between the different imaging modes for all points in the image.

9. The system of claim 8, further comprising a real-time imaging system using the different imaging modality.

10. The system of claim 9, wherein the real-time imaging system is an ultrasound imaging system and further comprises a trans rectal ultrasound probe operably connected to the at least one processor for generating imaging data.

11. The system of claim 8, further comprising a high definition imaging system operably connected with the at least one processor for generating the high definition images.

12. The system of claim 11, wherein the high definition imaging system is a magnetic resonance imaging system operably connected to a magnetic resonance imaging device.

13. The system of claim 12, further comprising an endorectal coil disposed in a subject to enhance the imaging of the high definition imaging system.

14. The system of claim 8, wherein the mean deformation and the plurality of deformation mode vectors are calculated by:
for each subject, spatially aligning the images to a common reference frame;
warping the imaging data for each subject from the different deformation states using an image similarity metric and a non-linear transformation technique; and
performing principal component analysis to determine the mean deformation and the plurality of deformation mode vectors.

15. A computer program product for providing a multi-modal deformable imaging registration, comprising at least one computer readable storage device having encoded thereon at least one computer executable program of instruction, characterized in the at least one computer executable program of instruction comprising:
program instructions for calculating a mean deformation and a plurality of deformation mode Eigenvectors for a body structure from images from the same high definition imaging mode with different deformation states for a plurality of subjects;
program instructions for performing a registration of landmark points between images from the high definition imaging modality and a different imaging modality for the same subject to calculate the deformation field transformation matrix for the landmarks from the images;
program instructions for determining weights for each deformation mode Eigenvector using deformation field values at the landmarks with the mean deformation and the deformation mode vectors; and
program instructions for summing the mean deformation field and the linear combination of the weighted deformation mode vectors to determine the deformation field between the different imaging modes.

* * * * *